UNITED STATES PATENT OFFICE.

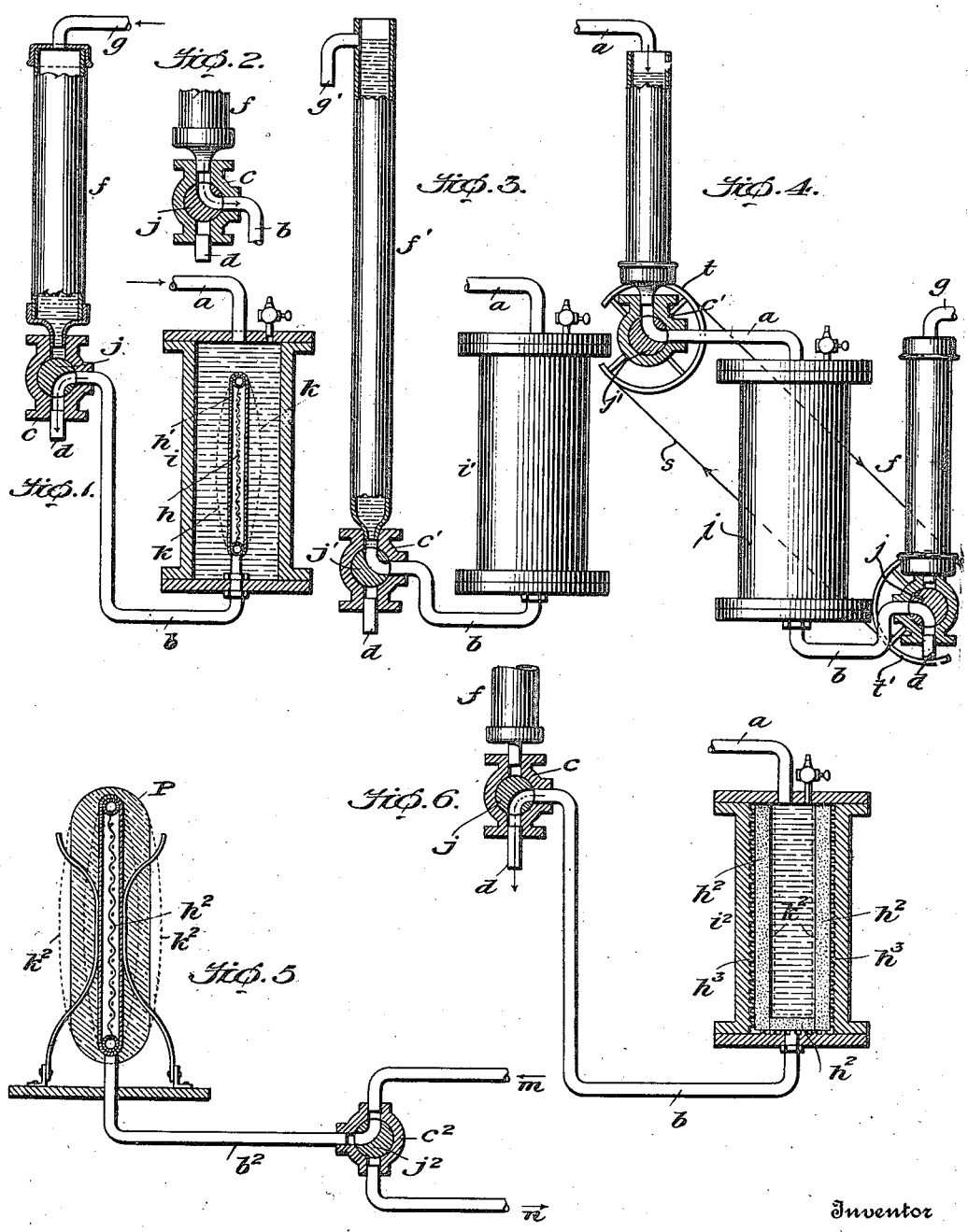

ALBERT LEGRAND GENTER, OF SALT LAKE CITY, UTAH.

METHOD AND APPARATUS FOR CLEANSING FILTER MEDIUMS.

1,214,152.   Specification of Letters Patent.   Patented Jan. 30, 1917.

Application filed November 5, 1915. Serial No. 59,882.

*To all whom it may concern:*

Be it known that I, ALBERT L. GENTER, a citizen of the United States, residing at Salt Lake City, in the county of Salt Lake and State of Utah, have invented certain new and useful Improvements in Methods and Apparatus for Cleansing Filter Mediums, of which the following is a specification.

My invention relates to a method of and apparatus for cleansing a filter medium and the invention consists of the method and apparatus substantially as hereinafter described and claimed.

In the accompanying drawing forming part of this specification I illustrate several forms of apparatus by which my process may be carried out, but the invention is not restricted to such apparatus or in fact to any particular type of apparatus, as it is obvious that I may resort to a variety of mechanical constructions and arrangements of parts to obtain the desired results, as hereinafter specified.

Figure 1 is a part sectional view and part elevation of a filter cell having a filtrate outlet and a controlling member and embodying the salient features of my invention. Fig. 2 is a detail showing a changed position of the controlling member. Fig. 3 illustrates a modified form of apparatus showing a further means of obtaining a back-pressure through the controlling member to the interior of the filter leaf or cell. Fig. 4 illustrates a synchronous arrangement of two rotating valves, one designed to be timed to give filtration pressure on the outside of a filter-leaf or element when the other attached to the filtrate outlet is turned to a position releasing a back-pressure. Fig. 5 is a modification showing a means of connecting a rotating valve or controlling member on the filtrate outlet so that any accumulated cake can be vibrated, pulsated or knocked off the filter medium after the completion of the filtering function. Fig. 6 is a modification of Fig. 1 illustrating a filter chamber having rigid porous filter walls made of porous stone, or other foraminous rigid material placed over corrugated sides and bottom of the filter chamber.

The primary object of this invention is to increase the capacity of a filtering surface on such materials that have high resistance to filtration, for instance colloids and such that pack tightly against the filtering medium during the separation of the contained solids and liquids by filtration under pressure or suction so as to prevent the free flow of liquid through the tight cake or film of sedimentary matter covering the filtering medium. This commonly occurs in instances where a large amount of liquid has to be separated from a small amount of colloidal or finely divided solids held in suspension. In the said instance, the rate of flow of clear material through the filtering medium is greater than the rate of precipitation of solids on the said medium and if the solids in suspension travel against the filter medium at the same velocity as the liquid being forced through the medium, the impact of solids against the medium is so great that they pack in tightly over the medium, thereby retarding the rate of filtration to such an extent that the initial outflow of clear liquid through the medium rapidly drops to an extent where an enormous amount of area is necessary to meet the demands of a large capacity. Any means that will prevent this packing of particles tightly over the medium will more or less keep up the initial outflow of filtrate or clear liquid and materially reduce the necessity of a large amount of filter area, and if used in connection with filter presses will give a thicker cake of solid material in a shorter time or at least result in a more copious capacity in outflow from the unit of filter area. In this respect my invention will simply and efficiently increase the capacity of any filter press under the same pressure and operating conditions that are usual if it is attached to same. It also has other advantages in discharging the accumulated cake after completed filtration, which I will now show.

It has long been the practice to cleanse the filtering surface free of accumulated material after completion of filtration, by applying a counter current of air, steam, gas, or liquid to the interior of a filter having rigid or expansible filtering sides and thus attempting to blow the accumulated material from the surface on which it has been collected.

In carrying out my invention I so place a rotating or sliding valve or other vibrating means on the filtrate outlet pipe that when in one position the filtrate with the hydraulic or filtration pressure back of it is forced out through one valve opening into the collecting launder, trough, or reservoir for same, and when in another position the valve connects the filtrate channel or pipe with a back-pressure means, gas, liquid or otherwise, in such a manner that the material on the filter medium is dislodged or loosened by the shock or counter current, thus making the medium free for the following outrush of filtrate when the rotating or sliding valve turns to the position where the back pressure is cut off and the filtrate under pressure is free to pass out into the open. If the valve is rotated or switched rapidly, it stands to reason that the filtration will consist of intermittent pulsations of clear liquid from the free opening of the valve and an opposing series of intermittent back-pressure pulsations on the interior of the filtering medium which pulsations hammer or pulsate the accumulated material away from, or loosely hanging to, said medium so that the packing action is materially reduced and the solids gradually accumulate in the filter cell or chamber instead of tightly packing on the filter medium thus permitting a free outflow of filtrate.

In the following description the filter medium is supposed to be of expansible character. This is mainly to emphasize the illustration of the cleansing action. It is obvious, however, that the countercurrent pulsation principle with its consequent cleansing action will also work on a filter medium that is held rigid.

In Fig. 1 a filter chamber, $i$, is illustrated in its simplest form, containing the filter element, $h$, which is covered with or whose sides are formed of the usual foraminous filter cloth or medium. $h'$, the interior of said filter element being connected to a filtrate outlet, $b$, which in its turn is connected to the rotating valve, $c$. This valve is also connected through one outlet with the pressure chamber, $f$, and through the other with the open outlet, $d$. The material to be filtered is forced into the pressure or filter chamber, $i$, through the ordinary means by way of pipe or passage, $a$. Connected to the fluid pressure chamber, $f$, is the pressure inlet, $g$.

In the form of apparatus shown in Fig. 1, if the material to be filtered is forced into the chamber, $i$, under pressure, the filtrate penetrates the sides $h'$ of the filter element, $h$, and passes out through the pipe, $b$, and through the open position of the rotating plug, $j$, of the valve, $c$, and finally is delivered through the discharge opening, $d$, as shown. During this operation the pressure that exists in the chamber, $f$, is cut off from connection with the pipe, $b$, and interior of the filter element so that the filtrate is free to pass for a short time out of discharge, $d$. If the plug, $j$, of the valve, $c$, is now switched or rotated into the position shown in Fig. 2, the pressure that exists in the fluid pressure chamber, $f$, opposes the filtration pressure in the pipe, $b$, in such a way that the interior of the filter element, $h$, suffers a shock due to the counter current induced through connecting the pressure chamber, $f$, with the pipe, $b$, so that if the filter element has its sides formed of flexible material, these sides will distend into the dotted position, $k$. If the sides are rigid they will withstand the shock although the film of accumulating material on the sides will, in taking up the shock, try to assume the position indicated by $k$ and thus be dislodged from the rigid sides of the filter element. If it be now assumed that the plug, $j$, of the valve, $c$, is rapidly switched or rotated from one position to the other and that the filtrate outlet, $b$, is kept full of filtrate at all times during filtration, the filtration pressure on one side of the filter element and the back pressure on the other side thereof will result in a piston action of the filtrate in the pipe, $b$, moving forward on the one hand through the free outlet, $d$, and suffering a shock on the other hand through being connected with the back pressure in the chamber, $f$, that will produce a vibrating or pulsating motion on the flexible or rigid sides of the filter element, keeping the pores of the same free from packed material and causing an intermittent delivery of filtrate collected in the pipe, $b$, out through the discharge, $d$.

It is clear that the back pressure means contemplated in Fig. 1 as entering the chamber, $f$, through the pipe, $g$, can be gained if the filtrate passing through the pipe, $b$, is collected in a long cylinder, $f'$ (see Fig. 3), and permitted to outflow through a pipe, $g'$, before the plug, $j$, is rotated or vibrated. The hydrostatic back pressure exerted by the weight of the filtrate in the cylinder, $f'$, will then automatically give substantially the back pressure means provided in the pressure chamber, $f$, Fig. 1. The action of this hydrostatic column is then the same during filtration when the plug, $j$, of the valve $c$, is rapidly rotated or switched as has already been described.

If the accumulated filtrate in the cylinder, $f'$, will exert a hydrostatic back pressure on the inside of the filter element, $h$, when the plug, $j$, is in proper position, it is clear that a similar column attached to the filter chamber inlet pipe, $a$, by means of valve, $c'$, and filled with the material to be filtered, which has a greater hydrostatic head than that exerted in the pressure chamber, $f'$, will exert a hydrostatic filtration pressure on the opposite or outside of the filter element, $h$. This is illustrated in Fig. 4. If the two rotating plugs, $j$ and $j'$, of Fig. 4, are so geared together and timed that when the plug, $j$, is in the open position shown in Fig. 4, and the plug, $j'$ is in the position connecting the column, $f'$ with the filter chamber, $i$, it is clear that the excess hydrostatic pressure in the chamber, $f'$, will cause filtrate to be forced through the filter and the pipes, $b$ and $d$. If both plugs $j$—$j'$ are, through gear or belt connections now switched or rotated into the opposite position, there will be an intermittent back or cleansing pressure exerted through the hydrostatic action in chamber, $f'$, as has already been described, the connection of the filter chamber, $i$, with the pressure chamber, $f'$, having in the meantime been disturbed through the valve, $j'$, assuming its new position. If this gear rotating device of both valves is worked rapidly enough, the intermittent filtering and back pressure action due to the two hydrostatic heads will not only give the filtration usual with the ordinary filter pump and filter press, but also give the pulsating cleansing action contemplated in my invention. This arrangement of synchronous vibrating parts does away with the necessity of a special filter pump.

It is also obvious that this pulsating back pressure means can be used especially for discharging the accumulated cakes from any filter element, as is shown in Fig. 5. The idea here is to pulsate or knock or vibrate the cake, P, off of the filter medium after it has been collected on the same through the ordinary filtration means. In Fig. 5, the filter element, $h^2$, with its outlet, $b^2$, is supposed to be removed from the filter chamber and connected to a valve, $c^2$ with its rotating plug, $j^2$. One outlet of the valve, $c^2$, is connected to pressure line, $m$, and the other outlet is connected to the suction or atmospheric line, $n$. It is clear that if the plug, $j^2$ is rapidly rotated, the gaseous or liquid pressure in the pressure line will at one period enter the filter element, $h^2$, tending to expand same to dotted position, $k^2$, and the pressure then existing in the filter element, $h^2$, will be released the minute the pressure in said element, $h^2$, and pipe, $b^2$, is connected through the plug rotation with the suction line, $n$. This alternating expanding and deflating of the foraminous sides of the filter element, $h^2$ together with the cleansing action of the gaseous or liquid pressure means in the line, $m$, and pipe, $b^2$, will result in a series of rapid vibrations that will easily dislodge or blow the cake, P, from the filter element. In fact practice has shown that this method of cleaning the filter medium of accumulated cake is much more thorough and efficient than the ordinary continuous back pressure action contemplated in known prior art.

In order to deflate the distended sides or side of the filter element instead of connecting the one outlet of the valve, $c^2$, with the suction means or atmospheric pressure, springs, $o$, bearing against the filter medium can be used. This arrangement is a valuable aid in accomplishing or making the vibratory motion of the filter medium more pronounced, which, of course, will be necessary in certain instances.

As hereinbefore mentioned, it is obvious that the pulsating back-pressure means can be used just as effectively on a filter medium with rigid sides. In Fig. 6, a filter chamber, $i^2$, with rigid filter lining, $h^2$, is shown in its simplest form. The sides, $h^3$, of the filter chamber are corrugated so as to conduct the filtrate passing through the rigid medium, $h^2$, to outlet, $b$, and rotating valve, $c$. The sides being rigid will withstand the pulsating shock which will be transferred to the much less rigid film, $k^2$, of accumulated material adhering to same and as a result this film will be dislodged from the rigid sides of the filter element.

Having thus described my invention what I claim as new and desire to secure by Letters Patent is:—

1. The process substantially as herein described, of cleansing a filter medium and facilitating the filtering function thereof, said process consisting, essentially, in alternately directing in substantially rapid succession the filter current against one side of said medium and a cleansing current against the opposite side of said medium.

2. The process substantially as herein described, of cleansing a filter medium and facilitating the filtering function thereof, said process consisting, essentially, in imparting a positive movement to opposite sides of the filtering medium alternately.

3. The process substantially as herein described, of cleansing a filter medium having flexible filtering sides and facilitating the filtering function of said sides, said process consisting, essentially, in imparting a positive rhythmical movement to the liquid by alternate pressures on opposite sides of said medium.

4. The process substantially as herein described, of cleansing a filter medium having filtering sides and facilitating the filtering function of said sides, said process consisting, essentially, in imparting a series of intermittent filtering pulsations against the outer surface of said sides and alternating therewith an opposed series of intermittent back pressure pulsations against the interior surfaces of said sides.

5. The process substantially as herein described, of cleansing a filter medium and facilitating the filtering function thereof, said process consisting, essentially, in giving alternate impulses to the filtering medium in one direction and utilizing the back pressure of filtrate obtained from a previous filtering period for giving alternate impulses to the filtering medium in the opposite direction.

6. In apparatus of the character described, the combination with a casing and a filter element therein having pulsative filtering sides, of a fluid-containing pressure chamber and a ported controlling member between said casing and chamber connecting the interior of the filter alternately with the pressure chamber and with the atmosphere.

7. In apparatus of the character described, the combination with a casing and a filter element therein having pulsative filtering sides, of a fluid-containing pressure chamber and a shiftable controlling member between said casing and chamber having a port connecting the interior of the filter alternately with the pressure chamber and with the atmosphere.

8. In apparatus of the character described, the combination with a filter casing, a filter medium therein having flexible sides, and a fluid-pressure chamber connected to the casing, of a controlling member in the connection between the casing and fluid-pressure chamber having a port alternately connecting the interior of the filter with the fluid-pressure chamber and intermediately with the atmosphere whereby a rhythmical movement is imparted to the liquid on both sides of said filtering medium.

In testimony whereof I affix my signature.

ALBERT LEGRAND GENTER.